United States Patent
Yan et al.

(10) Patent No.: US 9,682,435 B2
(45) Date of Patent: Jun. 20, 2017

(54) THREAD FORMING TAPS

(71) Applicant: Kennametal Inc., Latrobe, PA (US)

(72) Inventors: Yan Yan, Greensboro, NC (US);
Emmanuel Puviland, Dambach-la-Ville (FR)

(73) Assignee: KENNAMETAL INC., Latrobe, PA (US)

( * ) Notice: Subject to any disclaimer, the term of this patent is extended or adjusted under 35 U.S.C. 154(b) by 70 days.

(21) Appl. No.: 14/471,798

(22) Filed: Aug. 28, 2014

(65) Prior Publication Data

US 2016/0059334 A1    Mar. 3, 2016

(51) Int. Cl.
*B23G 5/06* (2006.01)
*B23G 5/00* (2006.01)
*B23G 7/02* (2006.01)

(52) U.S. Cl.
CPC .............. *B23G 5/06* (2013.01); *B23G 5/005* (2013.01); *B23G 7/02* (2013.01); *B23G 2200/30* (2013.01); *B23G 2200/34* (2013.01); *B23G 2240/12* (2013.01); *Y10T 408/9048* (2015.01); *Y10T 408/90467* (2015.01)

(58) Field of Classification Search
CPC ....... Y10T 408/9048; Y10T 408/90467; Y10T 408/9046; Y10T 408/455; B23G 5/06; B23G 5/005; B23G 2240/12; B23G 2200/28; B23G 2200/34; B23G 2200/48; B23G 2200/30; B23B 2231/54
See application file for complete search history.

(56) References Cited

U.S. PATENT DOCUMENTS

| | | | | |
|---|---|---|---|---|
| 832,380 A | * | 10/1906 | Hartness | B21D 51/24 408/219 |
| 1,567,733 A | * | 12/1925 | Hanson | B23G 5/06 407/24 |
| 1,826,323 A | * | 10/1931 | Mueller | B23G 5/20 408/219 |
| 2,898,612 A | * | 8/1959 | Hofbaner | B23G 5/20 29/281 |

(Continued)

FOREIGN PATENT DOCUMENTS

| | | | | |
|---|---|---|---|---|
| DE | 9216228 | | 1/1993 | |
| DE | 102006027232 | * | 12/2007 | B23C 5/02 |

(Continued)

OTHER PUBLICATIONS

Stephenson, David A. et al., Metal Cutting Theory and Practice, Second Edition, Taylor & Francis Group, 2006, CRC Press, 4 pages.

*Primary Examiner* — Eric A Gates
*Assistant Examiner* — Donte Brown
(74) *Attorney, Agent, or Firm* — Ian K. Samways

(57) ABSTRACT

In one aspect, thread forming taps are described herein. In some embodiments a thread forming tap comprises a shank disposed at a first end adapted to engage a tool holder and an elongated working portion disposed at a second end. The working portion comprises at least one helical thread and a plurality of longitudinally-extending linear grooves. The longitudinally-extending linear grooves intersect the helical thread forming a plurality of lobes, wherein adjacent lobes differ from one another in relief type and/or relief rate.

23 Claims, 5 Drawing Sheets

(56) References Cited

U.S. PATENT DOCUMENTS

| | | | | |
|---|---|---|---|---|
| 4,762,444 A * | 8/1988 | Mena | B23G 5/005 | 408/222 |
| 5,127,776 A * | 7/1992 | Glimpel | B23G 5/06 | 408/220 |
| 5,797,710 A * | 8/1998 | Sawabe | B23G 7/02 | 408/215 |
| 6,217,267 B1 * | 4/2001 | Sugano | B23G 7/02 | 408/220 |
| 6,918,718 B2 * | 7/2005 | Schwarz | B23G 5/06 | 408/220 |
| 7,073,988 B2 * | 7/2006 | Giessler | B23G 5/005 | 408/222 |
| 7,114,891 B2 * | 10/2006 | Hakansson | B23G 7/02 | 407/29 |
| 7,575,520 B2 * | 8/2009 | Adcock | B23G 7/02 | 470/198 |
| 8,087,856 B2 * | 1/2012 | Reed | B23G 5/06 | 408/215 |
| 8,192,290 B2 * | 6/2012 | Osawa | B23B 31/005 | 29/447 |
| 8,794,879 B2 * | 8/2014 | Durst | B23B 51/00 | 407/11 |
| 2004/0258492 A1 * | 12/2004 | Hakansson | B23G 7/02 | 408/222 |
| 2009/0074526 A1 * | 3/2009 | Song | B23G 5/06 | 408/222 |
| 2010/0260568 A1 * | 10/2010 | Osawa | B23G 5/18 | 409/74 |
| 2011/0020087 A1 * | 1/2011 | Yamamoto | B23G 7/02 | 408/219 |
| 2011/0201434 A1 * | 8/2011 | Edelmann | B23G 7/02 | 470/198 |
| 2013/0129448 A1 * | 5/2013 | Reed | F16B 33/02 | 411/411 |
| 2014/0105697 A1 * | 4/2014 | Osawa | B23B 31/005 | 408/57 |

FOREIGN PATENT DOCUMENTS

| | | | | |
|---|---|---|---|---|
| EP | 1864736 | | 12/2007 | |
| FR | 561349 A | * | 10/1923 | B23G 5/06 |
| FR | 2611154 A1 | * | 8/1988 | B23G 5/06 |
| GB | 196630 | | 7/1924 | |
| GB | 1090875 A | * | 11/1967 | B23G 5/06 |

* cited by examiner

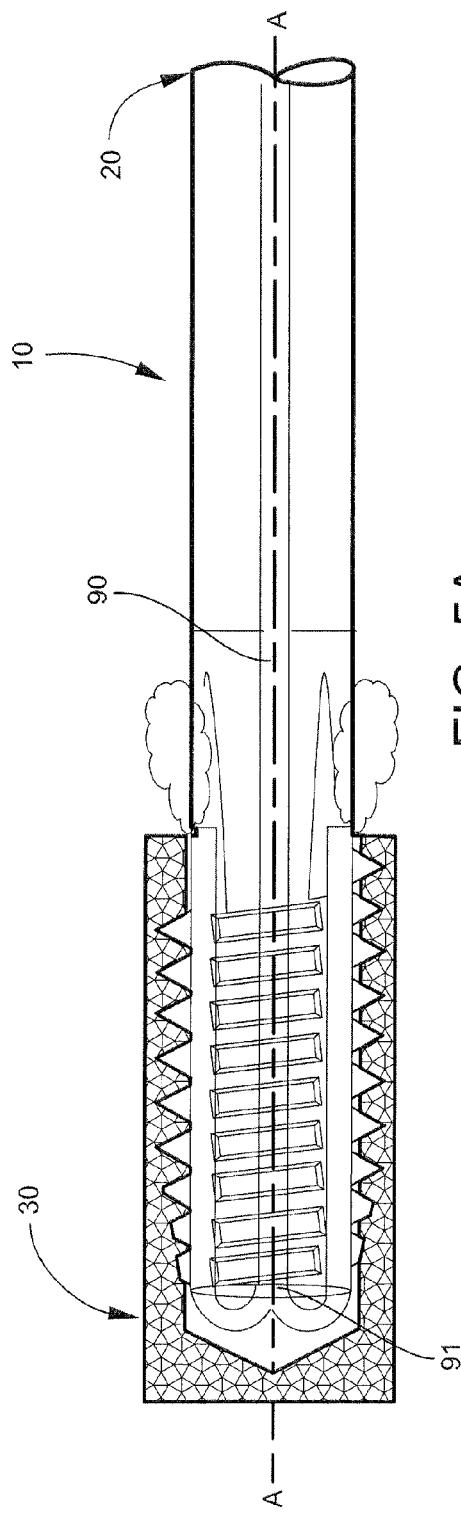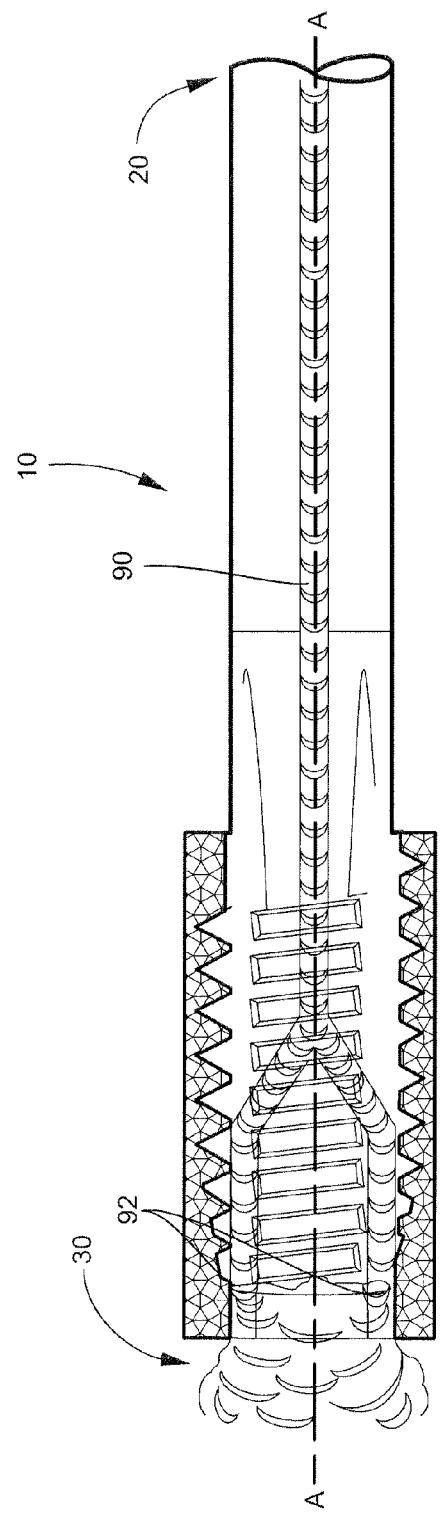

THREAD FORMING TAPS

FIELD

The present invention relates to threading tools and, in particular, to thread forming taps for use in cold forming applications.

BACKGROUND

Thread forming taps and tools employing the same are generally known. Forming taps permit the formation of internal threads in a workpiece through application of compressive force to interior surfaces. Moreover, forming taps can achieve thread formation with high quality surface finish without the generation of chips and can provide stronger internal threads with improved gaging as compared to cutting tools. Forming taps and associated thread forming tools can further provide improved tool life, reduced occurrence of breakage, and reduced machine downtime as compared to corresponding cutting tools.

Forming taps can be used with a variety of materials, in particular materials having relatively low tensile strengths, such as aluminum, copper, brass, zinc, and low carbon steels. Forming taps may additionally be employed in the formation of internal threads in both through-hole and blind-hole threading applications. As demands of thread forming applications continue to evolve, new tapping architectures and tap designs may be required to overcome limitations of prior architectures and designs.

SUMMARY

In one aspect, thread forming taps are described herein comprising a plurality of lobes disposed on a helical thread, wherein adjacent lobes differ in relief type and/or relief rate. For example, a thread-forming tap (hereinafter a "forming tap" or a "tap") described herein defines a longitudinal axis, a first end and a second end disposed axially away from the first end. A shank is disposed at the first end and is adapted to engage a tool holder. An elongated working portion is disposed at the second end, the working portion comprising at least one helical thread and a plurality of longitudinally-extending linear grooves. The longitudinally-extending linear grooves intersect the helical thread forming a plurality of lobes, wherein adjacent lobes differ from one another in at least one of relief type and relief rate.

In another aspect, a thread-forming tap described herein defines a longitudinal axis, a first end, and a second end disposed axially away from the first end. A shank is disposed at the first end and is adapted to engage a tool holder. An elongated working portion is disposed at the second end, the working portion comprising at least one helical thread and a plurality of lobes disposed on the at least one helical thread about the longitudinal axis. Adjacent lobes differ from one another in at least one of relief type and relief rate.

In a further aspect, thread-forming tools are described herein. A thread-forming tool comprises a tool holder and a thread forming tap coupled to the tool holder. The thread forming tap defines a longitudinal axis, a first end and a second end disposed axially away from the first end. A shank disposed at the first end engages the tool holder and an elongated working portion is disposed at the second end. The elongated working portion comprises at least one thread disposed helically about the working portion and a plurality of longitudinally-extending linear grooves intersecting the helical thread. Intersection of the linear grooves with the helical thread forms a plurality of lobes, wherein adjacent lobes differ from one another in at least one of relief type and relief rate.

BRIEF DESCRIPTION OF THE DRAWINGS

FIGS. 5A and 5B illustrate cross-sectional views of forming taps according to embodiments described herein.

DETAILED DESCRIPTION

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

Figure 1:
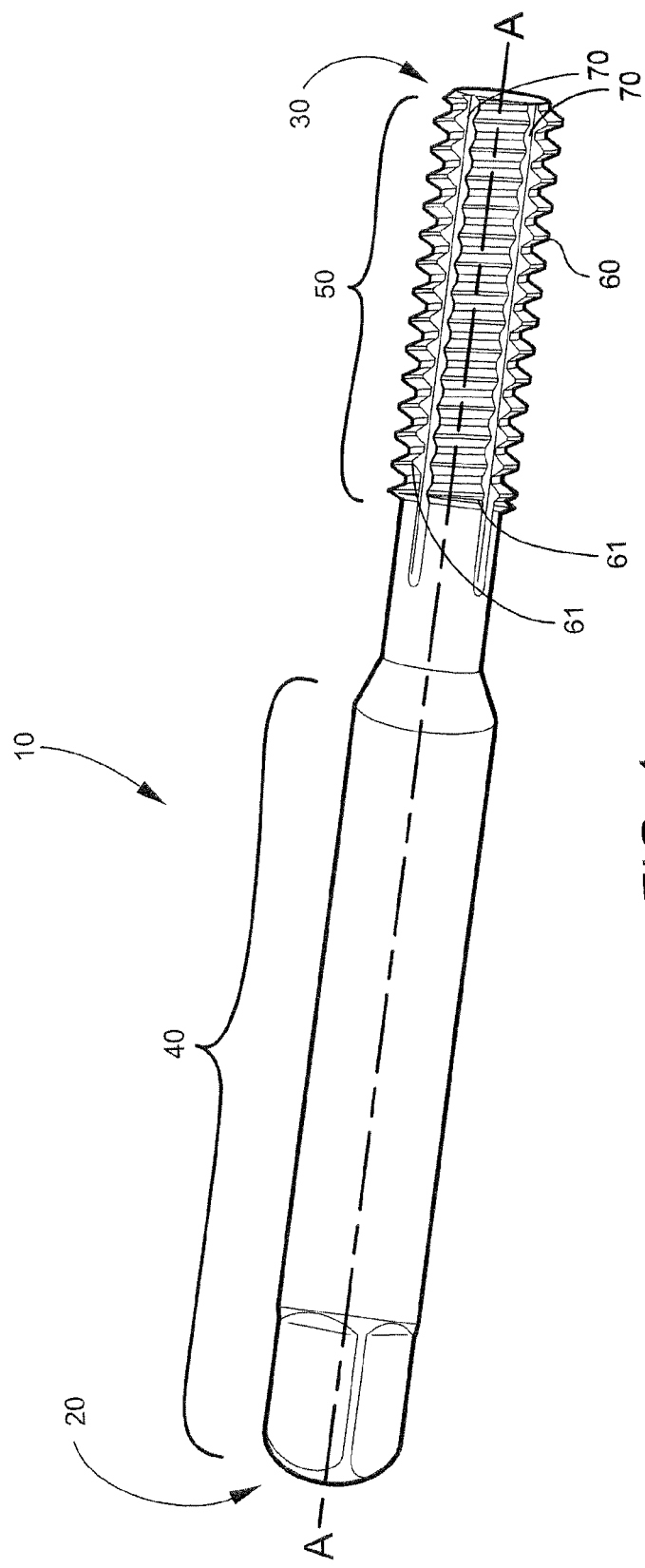
FIG. 1 illustrates a perspective view of a forming tap according to one embodiment described herein.
Figure 2:
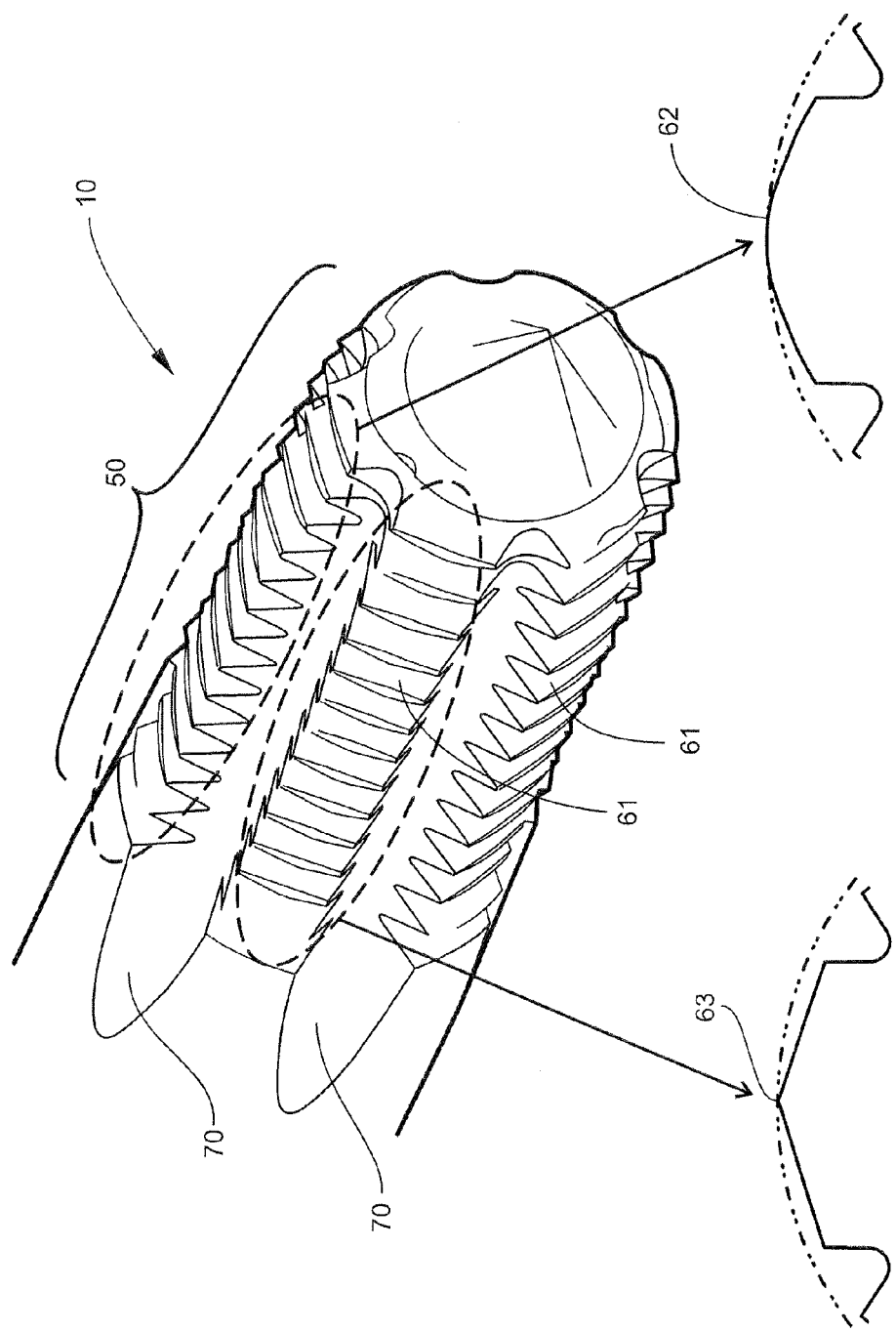
FIG. 2 illustrates a perspective view and schematic partial cross-sectional views of the working portion of a forming tap according to one embodiment described herein.
Figure 3:
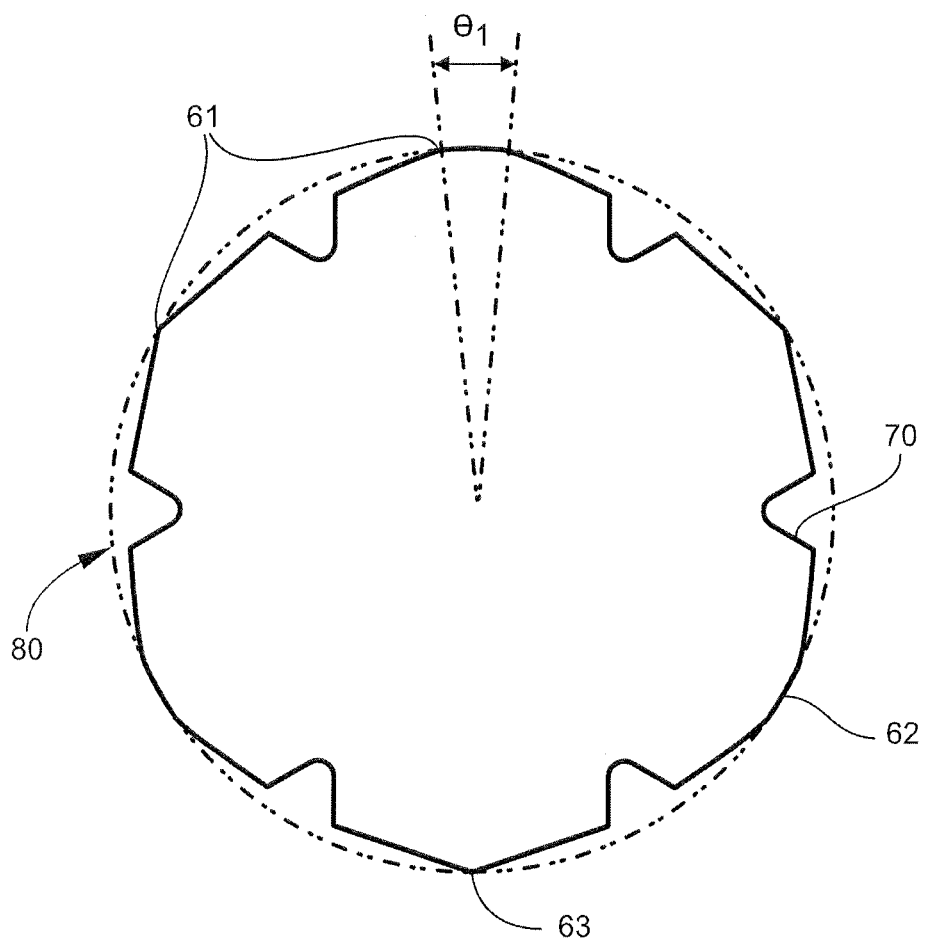
FIG. 3 illustrates a schematic cross-sectional view of a forming tap according to one embodiment described herein.

Referring now to FIGS. 1-3, there is illustrated a forming tap, generally designated as reference number 10, in accordance with one embodiment described herein. As provided in FIGS. 1 and 2, the forming tap (10) defines a longitudinal axis (A-A), a first end (20), and a second end (30) disposed axially away from the first end (20). The tap (10) comprises a shank (40) disposed at the first end (20) adapted to engage a tool holder (not shown) and an elongated working portion (50) disposed at the second end (30). The elongated working portion (50) comprises at least one thread, generally (60), disposed helically about the working portion (50) and can comprise a plurality of longitudinally-extending linear grooves (70) along the longitudinal axis (A-A). The linear grooves (70) intersect the helical thread, forming a plurality of lobes (61). Adjacent lobes (61) differ from one another in relief type and/or relief rate.

The linear grooves and plurality of lobes can be arranged or configured in any manner not inconsistent with the objectives of the present invention. For example, in some cases, a tap may have no longitudinally-extending linear grooves, one linear groove, or a plurality of linear grooves. In embodiments comprising a plurality of longitudinally-extending linear grooves, such grooves can be arranged generally axisymmetrically about the longitudinal axis. In other cases, the linear grooves are arranged asymmetrically about the longitudinal axis. The lobes can be individually selected to have zero relief (fully concentric lobe), con-eccentric relief, or eccentric relief. As understood by one of skill in the art, con-eccentric relief is a combination of concentric and eccentric relief. In some embodiments, for example, a first third of the land has a concentric margin, while the remaining two thirds of the land has eccentric relief. Further, lobes with an eccentric relief can exhibit the same or different relief rates.

For the purposes of the present disclosure and illustrated in FIG. 3, relief types are expressed relative to a virtual circle (80) defined by the outermost edges of the thread (60) in a helical cross-section of the working portion (50). The term "zero relief" as used herein indicates a lobe that is fully concentric to and/or cocircular with the virtual circle. The term "con-eccentric relief" as used herein indicates a relief comprising a portion less than the entirety of the relief that is concentric to and/or cocircular with the virtual circle. This portion is a "concentric margin," as such term is used herein. Portions of the land not within the concentric margin are eccentric portions. Concentric margins as described herein can subtend an angle $\theta_1$ as seen in FIG. 3. The angle $\theta_1$ can have any value not inconsistent with the objectives of the present disclosure. For example, a value of $\theta_1$ can be selected from Table 1.

TABLE I

| Value of $\theta_1$ (degrees) |
| --- |
| 0-10 |
| 0.5-10 |
| 1-10 |
| 2-10 |
| 4-10 |
| 0-6 |
| 0-8 |
| 3-7 |

Figure 4:
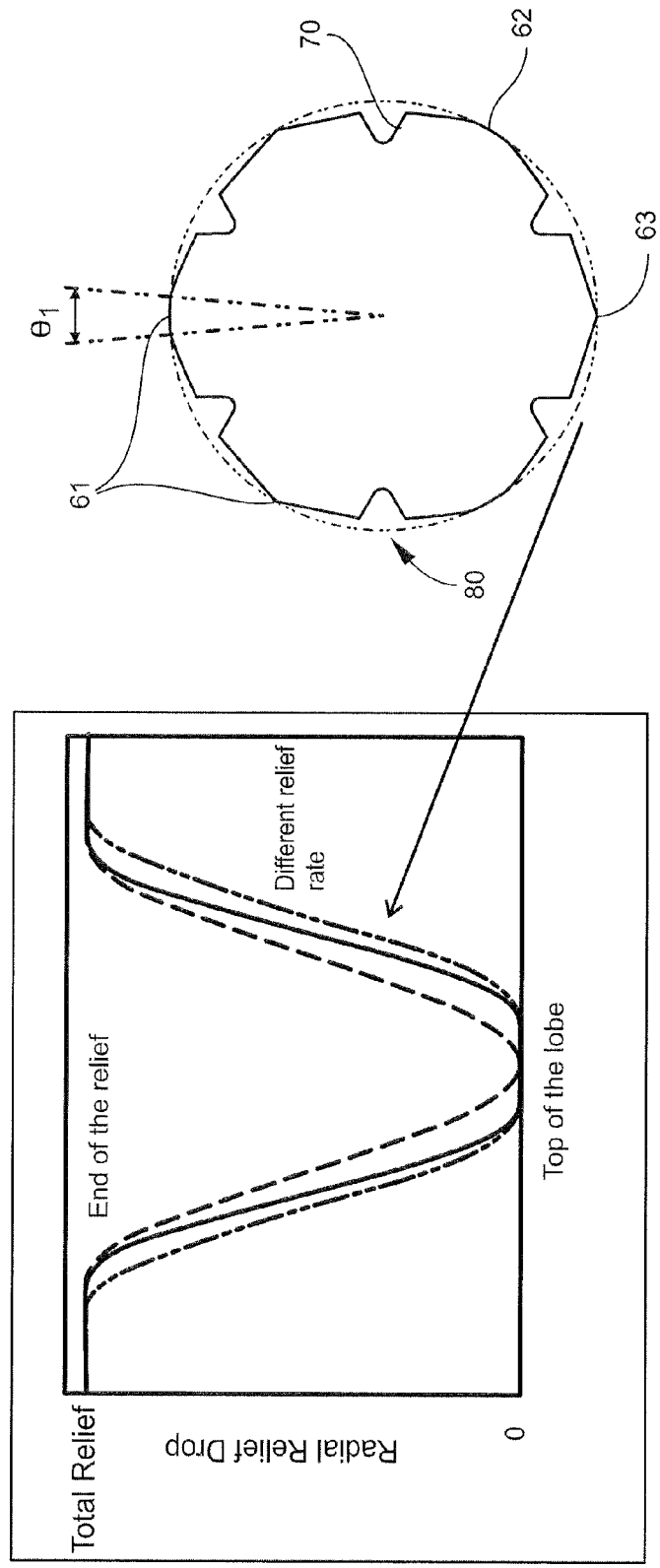
FIG. 4 illustrates the schematic view of FIG. 3 with a representation of various radial relief rates according to embodiments described herein.

An "eccentric relief" indicates a relief not comprising a line or are concentric to and/or cocircular with the virtual circle. Lobes comprising an eccentric relief can exhibit any shape or form not inconsistent with the objectives of the present disclosure. For example, the eccentric relief can comprise an apex (63). An apex (63) of an eccentric relief can comprise a single point which intersects and/or lies along the virtual circle, or an apex can comprise a curved portion which is neither concentric to nor cocircular with the virtual circle. Lobes (61) comprising an eccentric relief and/or an eccentric portion define a "relief rate," or a curved shape in a radial direction towards the longitudinal axis away from the apex along the periphery of the thread. FIG. 4 illustrates various non-limiting relief rates of eccentric reliefs as described herein.

In some cases, adjacent lobes (61) define an alternating pattern of relief type and/or relief rate. For example, in the embodiment of FIG. 3, lobes having con-eccentric reliefs alternate with lobes having eccentric reliefs. In such cases, the lobes of con-eccentric relief can define lands having a concentric margin (62) central thereto and lobes of eccentric relief defining apexes (63) central thereto. In certain other embodiments, adjacent lobes form an alternating pattern of first eccentric reliefs having a first eccentric relief rate and second eccentric reliefs having a second eccentric relief rate, the first and second relief rates being different from one another.

Forming taps (10) described herein can comprise any number of lobes (61) not inconsistent with the objectives of the present invention when viewed as a cross-section, as in FIG. 3. In some cases, forming taps (10) described herein can comprise an even number of lobes (61). For example, the cross-section can comprise at least 4 lobes (61), at least 6 lobes (61), or at least 8 lobes (61). In certain other cases, forming taps (10) described herein can comprise an odd number of lobes (61). For example, the cross-section can comprise at least 5 lobes (61), at least 7 lobes (61), or at least 9 lobes (61). Taps can further comprise a number of linear grooves (70) corresponding to the number of lobes (61). For example, a cross-section comprising 6 lobes (61) can also comprise 6 grooves (70).

As illustrated in FIGS. 5A and 5B, forming taps (10) can further comprise at least one coolant or lubricant channel (90). The coolant channel (90) can have any configuration not inconsistent with the objectives of the present invention. In some cases, as illustrated in FIG. 5A, the coolant channel (90) is entirely collinear with the longitudinal axis (A-A) and terminates in at least one axial coolant hole (91) at the second end (30) of the tap (10). In certain other cases, as in FIG. 5B, the coolant channel (90) is collinear with the longitudinal axis (A-A) along a substantial length thereof and terminates in at least two radial coolant holes (92) in at least two of the linear grooves (70). In some embodiments, a forming tap (10) can comprise a plurality of coolant holes (not shown) parallel to the longitudinal axis (A-A) and terminating in one or more axial or radial holes along the second end or in a plurality of radial grooves.

The working portion (50) of a forming tap (10) described herein can have any suitable exterior or peripheral shape or configuration. For example, in some cases, the helical thread (60) can define an entry taper at the second end (30). Any desired entry taper configuration can be employed. For example, the helical thread (60) can have an entry taper having a length (in number of thread pitches) selected from Table II:

TABLE II

| Length of taper (pitches) |
| --- |
| 1-10 |
| 1-1.5 |
| 2.5-3 |
| 3-5 |
| 5-8 |
| 8-10 |

A thread pitch is the distance from one point on a thread to an adjacent corresponding point on the thread in an axial direction measured parallel to the longitudinal axis. Lobes (61) disposed within an entry taper on the forming tap (10) described herein can comprise corresponding relief type and/or relief rate to the non-tapered lobes spaced distal from the second end (30). In some cases, lobes (61) disposed within an entry taper on the forming tap (10) described herein can comprise different relief type and/or relief rate to the non-tapered lobes spaced distal from the second end (30).

In another aspect, thread-forming tools are described herein. A thread-forming tool comprises a tool holder and a thread forming tap coupled to the tool holder. The thread forming tap defines a longitudinal axis, a first end and a second end disposed axially away from the first end. A shank disposed at the first end engages the tool holder and an elongated working portion is disposed at the second end. The elongated working portion comprises at least one thread disposed helically about the working portion and a plurality of longitudinally-extending linear grooves intersecting the helical thread. Intersection of the linear grooves with the helical thread forms a plurality of lobes, wherein adjacent lobes differ from one another in at least one of relief type and relief rate. For example, lobes of the forming tap described herein can be independently selected to have zero relief, con-eccentric relief, or eccentric relief. Further, lobes with an eccentric relief can exhibit the same or different relief rates. Further, the forming tap of the forming tool can have any architecture and/or properties described hereinabove.

Various embodiments of the invention have been described in fulfillment of the various objects of the invention. It should be recognized that these embodiments are merely illustrative of the principles of the present invention.

Numerous modifications and adaptations thereof will be readily apparent to those skilled in the art without departing from the spirit and scope of the invention.

The invention claimed is:

1. A tap for forming internal threads in a workpiece through application of a compressive force and substantially without the generation of chips, the tap defining a longitudinal axis, a first end, and a second end disposed axially away from the first end, the tap comprising:
   a shank disposed at the first end and adapted to engage a tool holder; and
   an elongated working portion disposed at the second end comprising:
      at least one thread disposed helically about the working portion;
      a plurality of longitudinally-extending linear grooves disposed about the longitudinal axis, the linear grooves intersecting the at least one helical thread; and
      a plurality of lobes formed by the intersection of the linear grooves with the at least one helical thread;
      said lobes comprising lobes that are adjacent to one another along a circumferential direction of the elongated working portion;
      wherein said adjacent lobes differ from one another based on at least one of:
      relief type and relief rate;
      wherein in a first of said adjacent lobes all thread portions are defined by a first relief type or relief rate; and
      wherein in a second of said adjacent lobes all thread portions are defined by a second relief type or relief rate different from the first relief type or relief rate.

2. The thread-forming tap of claim 1, wherein:
   said adjacent lobes differ from one another based on relief type; and
   the relief type of each of the adjacent lobes is selected from the group consisting of: zero relief, con-eccentric relief and eccentric relief.

3. The thread-forming tap of claim 1, wherein:
   said adjacent lobes differ from one another based on relief type; and
   said adjacent lobes define an alternating pattern, viewed along the helical direction of the least one helical thread, of lobes having con-eccentric relief and lobes having eccentric relief;
   at least one lobe having con-eccentric relief defining a land which has a concentric margin central thereto; and
   at least one lobe having eccentric relief defining an apex central thereto.

4. The thread-forming tap of claim 3, wherein the concentric margin subtends an angle in the range of about 0.5° to about 10°.

5. The thread-forming tap of claim 3, wherein a cross-section taken helically along the thread defines a virtual circle, and wherein each concentric margin is cocircular with the virtual circle and each apex intersects the virtual circle.

6. The thread-forming tap of claim 1, wherein said adjacent lobes differ from one another in relief rate.

7. The thread-forming tap of claim 6, wherein said adjacent lobes further differ from one another in relief type.

8. The thread-forming tap of claim 6, wherein said adjacent lobes form an alternating pattern of first eccentric reliefs having a first eccentric relief rate and second eccentric reliefs having a second eccentric relief rate, the first and second relief rates being different from one another.

9. The thread-forming tap of claim 1, wherein a cross-section taken helically along the at least one helical thread comprises an even number of lobes.

10. The thread-forming tap of claim 9, wherein the cross-section comprises at least 4 lobes.

11. The thread-forming tap of claim 9, wherein the cross-section comprises at least 6 lobes.

12. The thread-forming tap of claim 9, wherein the cross-section comprises at least 8 lobes.

13. The thread-forming tap of claim 1 further comprising at least one coolant channel collinear with the longitudinal axis and terminating in at least one axial coolant hole at the second end.

14. The thread-forming tap of claim 1 further comprising at least one coolant channel collinear with the longitudinal axis and terminating in at least two radial coolant holes in at least two of the linear grooves.

15. The thread-forming tap of claim 1, wherein the at least one helical thread defines an entry taper at the second end.

16. The thread-forming tap of claim 15, wherein the entry taper is between 1 and 10 thread pitches long.

17. The thread forming tap of claim 15, wherein the entry taper is between 3 and 5 thread pitches long.

18. The thread-forming tap of claim 1, wherein the plurality of grooves are disposed generally axisymmetrically about the longitudinal axis.

19. A tap for forming internal threads in a workpiece through application of a compressive force and substantially without the generation of chips, the tap defining a longitudinal axis, a first end, and a second end disposed axially away from the first end, the tap comprising:
   a shank disposed at the first end and adapted to engage a tool holder; and
   an elongated working portion disposed at the second end comprising:
      at least one thread disposed helically about the working portion; and
      a plurality of lobes disposed on the at least one thread about the longitudinal axis;
      said lobes comprising lobes that are adjacent to one another along a circumferential direction of the elongated working portion;
      wherein in a first of said adjacent lobes all thread portions are defined by a first relief type or relief rate; and
      wherein in a second of said adjacent lobes all thread portions are defined by a second relief type or relief rate different from the first relief type or relief rate.

20. The thread-forming tap of claim 19, wherein the elongated working portion further comprises at least one longitudinally-extending linear groove intersecting the at least one helical thread.

21. A thread-forming tool comprising:
   a tool holder configured to receive a thread-forming tap; and
   a tap, coupled to the tool holder, for forming internal threads in a workpiece through application of a compressive force and substantially without the generation of chips, the tap defining a longitudinal axis, a first end, and a second end disposed axially away from the first end, the tap comprising:
      a shank disposed at the first end and adapted to engage the tool holder; and
      a working portion disposed at the second end comprising:
         at least one thread disposed helically about the working portion;

a plurality of longitudinally-extending linear grooves disposed about the longitudinal axis, the linear grooves intersecting the at least one thread; and a plurality of lobes formed by the intersection of the linear grooves with the at least one thread;

said lobes comprising lobes that are adjacent to one another along a circumferential direction of the elongated working portion;

wherein said adjacent lobes differ from one another based on at least one of: relief type and relief rate;

wherein in a first of said adjacent lobes all thread portions are defined by a first relief type or relief rate; and wherein in a second of said adjacent lobes all thread portions are defined by a second relief type or relief rate different from the first relief type or relief rate.

22. The thread-forming tool of claim 21, wherein:

said adjacent lobes differ from one another based on relief type; and the relief type of each of the adjacent lobes is selected from the group consisting of: zero relief, con-eccentric relief and eccentric relief.

23. The thread-forming tool of claim 21, wherein:

said adjacent lobes differ from one another based on relief type; and said adjacent lobes define an alternating pattern, along the helical direction of the least one helical thread, of lobes having con-eccentric relief and lobes having eccentric relief.

* * * * *